United States Patent
Kambe

(10) Patent No.: US 11,307,822 B2
(45) Date of Patent: Apr. 19, 2022

(54) DISPLAY CONTROL DEVICE, DISPLAY DEVICE, AND CONTROL METHOD

(71) Applicant: SHARP KABUSHIKI KAISHA, Sakai (JP)

(72) Inventor: Tatsuya Kambe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/037,679

(22) Filed: Sep. 30, 2020

(65) Prior Publication Data
US 2021/0096801 A1    Apr. 1, 2021

(30) Foreign Application Priority Data

Oct. 1, 2019  (JP) .............................. JP2019-181355

(51) Int. Cl.
*G06F 3/14* (2006.01)
*G09G 3/20* (2006.01)

(52) U.S. Cl.
CPC ............. *G06F 3/1415* (2013.01); *G09G 3/20* (2013.01); *G09G 2330/023* (2013.01)

(58) Field of Classification Search
CPC ........ G09G 5/18; G09G 5/12; G09G 2310/08; G09G 5/006; G09G 2340/0435; G09G 2330/021; G09G 3/20; G09G 5/003; G09G 2370/08; G09G 2360/18; G09G 5/14; G09G 5/008; G09G 5/10
See application file for complete search history.

(56) References Cited

U.S. PATENT DOCUMENTS

| 6,909,434 | B2* | 6/2005 | Takala ................... | G09G 5/393 |
| | | | | 345/503 |
| 9,058,676 | B2* | 6/2015 | Tripathi ................. | G09G 5/393 |
| 9,064,449 | B2* | 6/2015 | Kerofsky ................ | G09G 3/20 |
| 9,153,212 | B2* | 10/2015 | Tripathi ................ | G09G 5/001 |
| 10,809,791 | B2* | 10/2020 | Kim ...................... | G06F 1/3287 |
| 2007/0195040 | A1* | 8/2007 | Park ..................... | G09G 3/3648 |
| | | | | 345/89 |

(Continued)

FOREIGN PATENT DOCUMENTS

| CN | 101615383 A | 12/2009 |
| CN | 103077693 A | 5/2013 |

(Continued)

*Primary Examiner* — Olga V Merkoulova
(74) *Attorney, Agent, or Firm* — ScienBiziP, P.C.

(57) ABSTRACT

A display control device that controls a display device including a display panel on which an image is rendered to display the image, the display control device includes: a host controller that obtains or generates image data of the image; and a display controller that outputs the image data to the display panel, wherein the host controller issues a request for rendering update of the image to the display controller, and transfers the image data to the display controller at a predetermined frequency; and when the display controller outputs first image data to the display panel, and then second image data is transferred from the host controller to the display controller, the display controller determines whether the first image data and the second image data are same or different from each other to determine whether or not the second image data is to be output to the display panel.

10 Claims, 7 Drawing Sheets

(56) References Cited

U.S. PATENT DOCUMENTS

| | | | | |
|---|---|---|---|---|
| 2007/0230569 A1* | 10/2007 | Itoh | ............ | G09G 3/20 375/240.01 |
| 2007/0273682 A1* | 11/2007 | Yi | ............ | G09G 3/3611 345/211 |
| 2010/0123727 A1* | 5/2010 | Kwa | ............ | G06F 1/3218 345/522 |
| 2011/0063312 A1* | 3/2011 | Hong | ............ | G06T 1/60 345/530 |
| 2011/0078536 A1* | 3/2011 | Han | ............ | H03M 13/09 345/545 |
| 2011/0205481 A1* | 8/2011 | Aruga | ............ | G09G 3/3648 349/151 |
| 2013/0106872 A1* | 5/2013 | Peng | ............ | G09G 3/20 345/519 |
| 2013/0162682 A1* | 6/2013 | Quero | ............ | G09G 5/34 345/649 |
| 2013/0187937 A1* | 7/2013 | Kerofsky | ............ | G09G 3/20 345/530 |
| 2015/0379665 A1* | 12/2015 | Kwa | ............ | G09G 5/18 345/522 |
| 2016/0196781 A1* | 7/2016 | Tanaka | ............ | G09G 3/3688 345/88 |
| 2021/0096801 A1* | 4/2021 | Kambe | ............ | G09G 3/20 |

FOREIGN PATENT DOCUMENTS

| | | |
|---|---|---|
| JP | 2017-523447 A | 8/2017 |
| WO | 2015/200631 A1 | 12/2015 |

* cited by examiner

FIG.6

DISPLAY CONTROL DEVICE, DISPLAY DEVICE, AND CONTROL METHOD

BACKGROUND

1. Field

The present disclosure relates to a display control device, a display device including the display control device, and a control method.

2. Description of the Related Art

General display devices, such as those typified by liquid-crystal display devices, operate at certain drive frequencies (e.g., 60 Hz). However, in recent years, there have been demands for driving a display device at various drive frequencies.

In a display device disclosed in Japanese Unexamined Patent Application Publication (Translation of PCT Application) No. 2017-523447, a receiver receives an image from a platform and determines whether or not the received image is the same as a preceding image. When the received image is different from the preceding image, a display interface causes the received image to be directly displayed on a display. On the other hand, when the received image is the same as the preceding image, the display interface stops transferring an image to the display until a rendering time measured by a timer reaches a predetermined time. Through such an operation, the display device reduces the drive frequency to thereby achieve a reduction in the power consumption.

SUMMARY

However, in related art as that described above, since the configuration in which a timer measures the rendering time is employed, there are problems in that the response of rendering update is delayed, and it is also difficult to flexibly deal with changes in image data to perform the rendering update.

One aspect of the present disclosure has been made in view of the foregoing, and it is desirable to provide a display control device that allows the response of rendering update to be maintained in a favorable state while reducing the power consumption.

According to an aspect of the present disclosure, there is provided a display control device that controls a display device including a display panel on which an image is rendered to display the image. The display control device includes: a host controller that obtains or generates image data of the image; and a display controller that outputs the image data to the display panel, the image data being transferred from the host controller to the display controller. The host controller outputs a vertical synchronization signal to the display controller, issues a request for rendering update of the image to the display controller, and transfers the image data to the display controller at a predetermined frequency. When the display controller outputs first image data to the display panel, and then second image data is transferred from the host controller to the display controller, the display controller determines whether the first image data and the second image data are same or different from each other to determine whether or not the second image data is to be output to the display panel.

According to another aspect of the present disclosure, there is provided control method for a display control device that controls a display device including a display panel on which an image is rendered to display the image. The display control device includes a host controller that obtains or generates image data, and a display controller that outputs the image data to the display panel in the display device, the image data being transferred from the host controller to the display controller. The control method including: causing the host controller to output a vertical synchronization signal to the display controller, to issue a request for rendering update of the image to the display controller, and to transfer the image data to the display controller at a predetermined frequency; and causing, when the display controller outputs first image data to the display panel, and then second image data is transferred from the host controller to the display controller, the display controller to determine whether the first image data and the second image data are same or different from each other to determine whether or not the second image data is to be output to the display panel.

BRIEF DESCRIPTION OF THE DRAWINGS

FIG. 6 has timing charts illustrating examples of the operation of the display device.

DESCRIPTION OF THE EMBODIMENTS

First Embodiment

Figure 1:
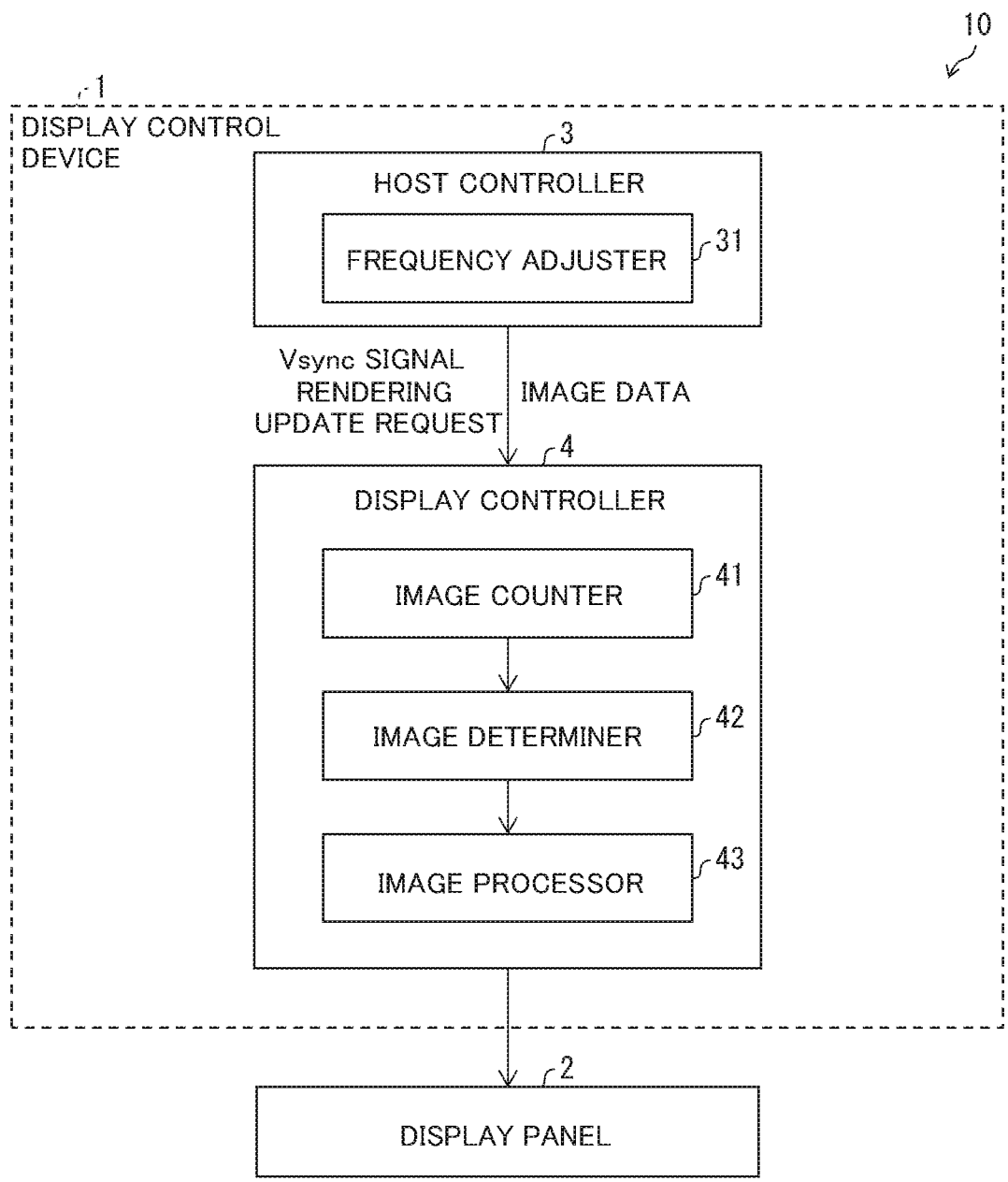
FIG. 1 is a block diagram illustrating the configuration of a display device according to a first embodiment of the present disclosure.

FIG. 1 is a block diagram illustrating the configuration of a display device 10 according to a first embodiment. As illustrated in FIG. 1, the display device 10 includes, at least, a display control device 1 and a display panel 2. The display device ID may be any type of electronic equipment having a display screen. Exemplary examples of such equipment include a mobile phone, a smartphone, a notebook personal computer (PC), a tablet terminal, an electronic book reader, and a personal digital assistant (PDA).

(Configuration of Display Control Device 1)

A display control device 1 controls the display device 10, which includes a display panel 2 that renders an image to display the image. The display control device 1 includes a host controller 3 and a display controller 4. The host controller 3 includes a frequency adjuster 31, and the display controller 4 includes an image counter 41, an image determiner 42, and an image processor 43.

(Configuration of Host Controller 3)

The host controller 3 obtains or generates image data to be displayed on the display panel 2 and transfers the image data to the display controller 4 at a predetermined frequency (Hz). The host controller 3 outputs a vertical synchronization signal (a Vsync signal) to the display controller 4 as a clock signal that serves as a reference for an operation of the display controller 4.

The host controller 3 transmits a rendering update request to the display controller 4 together with or separately from the image data. The rendering update request is an instruction for displaying the image data on the display panel 2. The format of the image data is not particularly limiting, as long as it can be displayed by the display panel 2.

The frequency adjuster 31 adjusts the aforementioned predetermined frequency. Specifically, after transferring image data of one frame, the frequency adjuster 31 transfers blank data and adjusts the length (ms) of the blank data to thereby adjust the predetermined frequency. Since the predetermined frequency of a host side (e.g., a portable terminal) can be adjusted as described above, for example, both the predetermined frequency and the frequency of image-data output of the display controller 4 can be reduced to reduce the overall power consumed by the display control device 1.

In accordance with the adjusted predetermined frequency, the display controller 4 can switch the operation mode of the display panel 2. Specifically, for example, when the predetermined frequency is reduced by the adjustment, the display controller 4 can switch the operation mode of the display panel 2 to a still-image display mode in which a still image, which is an image that does not change from one frame to another, is displayed. Also, for example, when the predetermined frequency is increased by the adjustment, the display controller 4 can switch the operation mode of the display panel 2 to a moving-image display mode in which a moving image, which is an image that changes from one frame to another, is displayed.

The host controller 3 is a control circuit formed at a substrate and can be at least partly implemented by a central processing unit (CPU), a memory, and so on. The host controller 3 mainly performs control for the host side in the display control device 1.

(Display Controller 4)

The display controller 4 drives the display panel 2 in accordance with an instruction from the host controller 3. After outputting first image data to the display panel 2, the image counter 41 counts the number of pieces of second image data transferred from the host controller 3.

The display controller 4 operates based on unit periods. This unit periods are, for example, minimum time intervals at which the image determiner 42 checks whether or not a rendering update request is received from the host controller 3. In general, the unit periods match the intervals of the vertical synchronization signal (the Vsync signal).

In a first unit period, the image determiner 42 checks whether or not a rendering update request is received from the host controller 3. Upon receiving the rendering update request, the image determiner 42 determines whether the first image data and the second image data are the same or different from each other and issues a notification indicating a result of the determination to the image processor 43.

When the first image data and the second image data are the same, and the counted number of pieces of the second image data is smaller than a predetermined count threshold, the image processor 43 invalidates the second image data in a second unit period next to the first unit period. Invalidating the second image data corresponds to, for example, a case in which the second image data is deleted or a case in which the second image data is stored in a predetermined memory. This makes it possible to reduce the frequency of image-data output of the display controller 4 and makes it possible to reduce the power consumed by the display controller 4.

On the other hand, when the first image data and the second image data are different from each other, or when the counted number of pieces of the second image data reaches the predetermined count threshold, the image processor 43 outputs the second image data to the display panel 2 in the second unit period. Thus, for example, compared with a case in which the rendering update is performed based on rendering-time measurement using a timer, the response of the rendering update is sped up, and it is also possible to perform rendering update that flexibly deals with changes in the image data.

Also, a period during which the display panel 2 can continue to display a certain image when the display controller 4 does not output new image data (this period is hereinafter referred to as an "image retention period") is largely dependent on a charge retention characteristic of the display panel 2. In this respect, according to the configuration described above, the image retention period of an image corresponding to the first image data after the first image data is output to the display panel 2 is, at the longest, a period until the number of pieces of the second image data transferred to the display controller 4 reaches the predetermined count threshold. Thus, when the predetermined count threshold is set according to the charge retention characteristic of the display panel 2 so that the period until the number of pieces of the second image data transferred to the display controller 4 reaches the predetermined count threshold is within the image retention period of the display panel 2, images can be seamlessly displayed on the display panel 2.

The display controller 4 generates timing signals (such as source clock pulses, gate start pulses, and gate clock pulses) for driving the display panel 2 and data signals (source signal data representing images) and outputs these signals to the display panel 2.

According to this configuration, when the first image data and the second image data are the same, for example, the display controller 4 is allowed not to output the second image data to the display panel 2. Thus, the frequency of the image-data output of the display controller 4 can be reduced by not performing rendering update on an image that is the same as a certain image displayed on the display panel 2. As a result, it is possible to reduce the power consumed by the display controller 4.

Also, for example, when the first image data and the second image data are different from each other, the display controller 4 can output the second image data to the display panel 2. That is, when the image data of an image that is different from a certain image displayed on the display panel 2 is transferred to the display controller 4, it is possible to immediately perform rendering update of the image on the display panel 2. Thus, for example, compared with a case in which the rendering update is performed based on rendering-time measurement using a timer, the response of the rendering update is sped up, and it is also possible to perform rendering update that flexibly deals with changes in the image data.

Also, in the display control device 1, since the frequency of the image-data output can be reduced with only the processing at the display controller 4, the image data can be transferred from the host controller 3 with the predetermined frequency being increased to, for example, 30 to 60 Hz, while reducing the power consumed by the display controller 4. Thus, it is possible to prevent or reduce an increase in the intervals of outputting the vertical synchronization signal, so that the response of the rendering update can be maintained in a favorable state.

(Display Panel 2)

The display panel 2 includes a display screen having a plurality of pixels, a source driver, a gate driver, and so on. The display panel 2 can be implemented by, for example, an oxide semiconductor display panel, which is an active matrix display panel. The oxide semiconductor display panel is a display panel in which switching elements provided so as to correspond to at least respective two-dimensionally arrayed pixels employ oxide semiconductor thin-film transistors (TFTs). The oxide semiconductor TFTs are TFTs in which oxide semiconductors are used in a semiconductor layer. One example of the oxide semiconductors is an oxide semiconductor (InGaZnO oxide semiconductor) using an oxide of indium, gallium, and zinc.

In the oxide semiconductor TFTs, the amount of electrical current that flows in an on state is large, and Thus, since the switching elements employ the oxide semiconductor TFTs, the pixel aperture ratio can be increased, and the refresh rate of images displayed on the display screen can be reduced to about 1 Hz.

A reduction in the refresh rate provides a power saving effect. An increase in the pixel aperture ratio provides the effect of increasing the display brightness or a power-saving effect due to a reduction in the light intensity of a backlight when the display brightness is made equal to that of an amorphous silicon display panel or the like.

Although the description below will be given assuming that display elements of the pixels are liquid-crystal display elements, they may be other display elements, such as organic electroluminescent (EL) display elements, when the display panel 2 is a liquid-crystal display panel, the display device 10 has a backlight (not illustrated) at the back side of the display panel 2.

(Example of Operation of Display Device 10)

Figure 2:
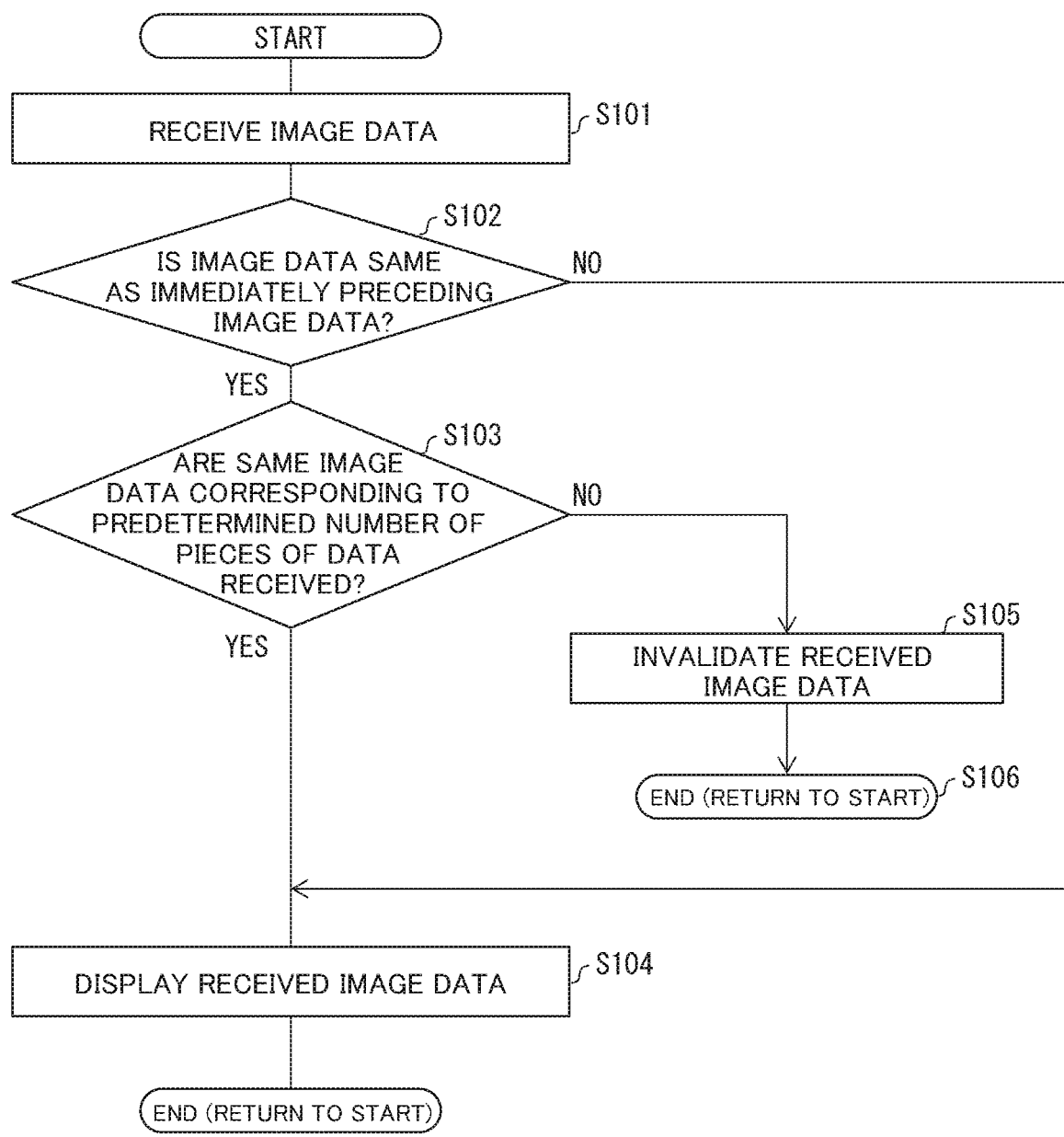
FIG. 2 is a flowchart illustrating one example of the operation of the display device.

Next, one example of the operation of the display device 10 will be described with reference to the flowchart in FIG. 2. In step S101 illustrated in FIG. 2, the display controller 4 receives image data from the host controller 3 and advances to step S102.

In step S102, the image determiner 42 determines whether or not the received image data (which corresponds to the second image data described above) is the same as immediately preceding image data (which corresponds to the first image data described above). In this case, if the second image data is the same as the first image data (YES), the process proceeds to step S103. On the other hand, if the second image data is different from the first image data (NO), the process proceeds to step S104.

In step S103, the image counter 41 counts the number of pieces of the second image data transferred from the host controller 3 after the first image data is output to the display panel 2. Next, the image processor 43 determines whether or not the same image data (the second image data) corresponding to a predetermined number of pieces of data are received. If the same image data corresponding to the predetermined number of pieces of data are received (YES), the process proceeds to step S104. On the other hand, if the same image data corresponding to the predetermined number of pieces of data are not received (NO), the process proceeds to step S105.

In step S104, the image processor 43 causes the received image data (the second image data) to be displayed on the display panel 2. Thereafter, the process ends (returns to Start). On the other hand, in step S105, the image processor 43 invalidates the received image data (the second image data). The process then proceeds to step S106 and ends (returns to Start").

Figure 3:
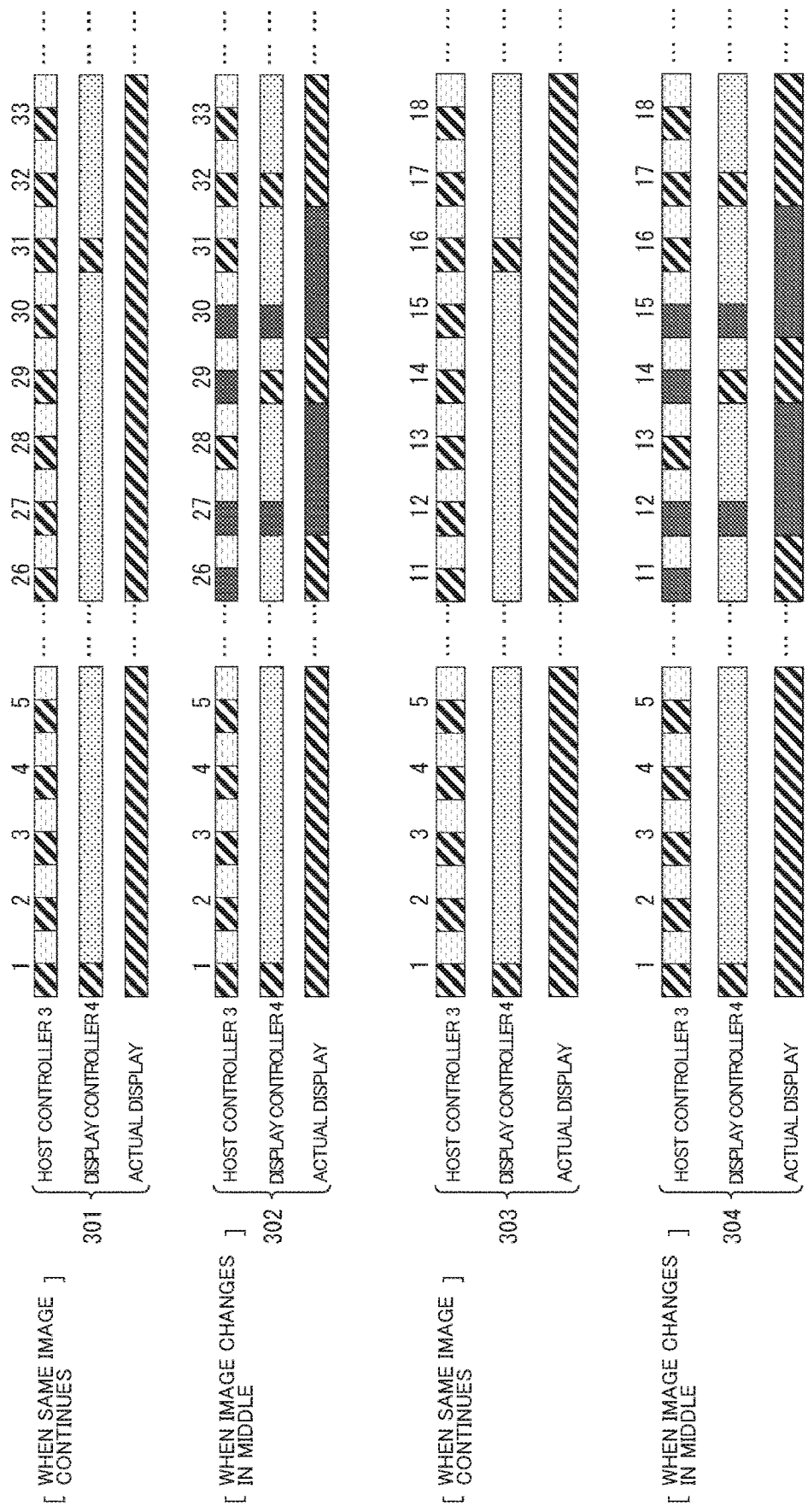
FIG. 3 has timing charts illustrating examples of the operation of the display device.

Next, operation examples of the display device 10 will be described with reference to FIG. 3. A timing chart denoted by number 301 in FIG. 3 illustrates an operation example of the host controller 3, the display controller 4, and the display panel 2 when the frequency of the host side is fixed to 30 Hz. In the timing charts in FIG. 3, numerals shown above each timing chart for the host controller 3 represent the numbers of the unit periods. For example, numeral "2" represents the number of the second unit period.

In the second unit period, a determination is made as to whether or not image data A received in the second unit period is the same as image data A received in the first unit period. In this case, since these pieces of image data A are the same, the image data A is invalidated in the third unit period. Thus, in the third unit period, the display controller 4 enters a dormant state.

Next, in the third unit period, a determination is made as to whether or not image data A received in the third unit period is the same as the image data A received in the second unit period. In this case, since these pieces of image data A are the same, the image data A is invalidated in the fourth unit period. Thus, in the fourth unit period, the display controller 4 enters the dormant state.

Since the same image data A is continuously transferred from the first to 30th unit periods in the manner described above, the display controller 4 is in the dormant state from the third to 30th unit periods.

In this example, since the frequency of the host controller 3 is set to 30 Hz, the predetermined count threshold is also 30 correspondingly. Thus, since the predetermined count threshold is reached in the 30th unit period, image data A transferred in the 30th unit period is output to the display panel 2 in the 31st unit period.

Next, a timing chart denoted by number 302 in FIG. 3 illustrates another operation example when the frequency at the host side is fixed to 30 Hz. In the 26th unit period, received image data B is different from image data A transferred in the first to 25th unit periods. Thus, in the 27th unit period, the image data B is output to the display panel 2.

In the 28th unit period, received image data A is different from the image data B received in the 27th unit period. Thus, in the 29th unit period, the image data A received in the 28th unit period is output to the display panel 2.

Next, in the 29th unit period, received image data B is different from the image data A transferred in the 28th unit period. Thus, in the 30th unit period, the image data B is output to the display panel 2.

Next, in the 31st unit period, received image data A is different from image data B transferred in the 30th unit period. Thus, in the 32nd unit period, the image data A is output to the display panel 2.

In the 32nd unit period, a determination is made as to whether or not the image data A received in the 31st unit period is the same as image data A received in the 32nd unit period. In this case, since these pieces of image data A are the same, the image data A is invalidated in the 33rd unit period. Thus, in the 33rd unit period, the display controller 4 enters the dormant state.

Next, a timing chart denoted by number 303 in FIG. 3 illustrates an operation example when the frequency at the host side is fixed to 15 Hz. In the second unit period, a determination is made as to whether or not image data A received in the second unit period is the same as image data A received in the first unit period. In this case, since these pieces of image data A are the same, the image data A is invalidated in the third unit period. Thus, in the third unit period, the display controller 4 enters the dormant state.

Since the same image data A is continuously transferred from the third to 15th unit periods in the manner described above, the display controller 4 is in the dormant state from the third to 15th unit periods.

In this example, since the frequency of the host controller 3 is set to 15 Hz, the predetermined count threshold is also 15 correspondingly. Thus, since the predetermined count threshold is reached in the 15th unit period, the image data A transferred in the 15th unit period is output to the display panel 2 in the 16th unit period.

A timing chart denoted by number 304 in FIG. 3 illustrates another operation example when the frequency at the host side is fixed to 15 Hz. In the 11th unit period, received image data B is different from image data A transferred in the first to tenth unit periods. Thus, in the 12th unit period, the image data B is output to the display panel 2.

In the 13th unit period, received image data A is different from image data B received in the 12th unit period. Thus, the image data A received in the 13th unit period is output to the display panel 2 in the 14th unit period.

Next, in the 14th unit period, received image data B is different from the image data A received in the 13th unit period. Thus, in the 15th unit period, the image data B is output to the display panel 2.

Next, in the 16th unit period, received image data A is different from image data B transferred in the 15th unit period. Thus, in the 17th unit period, the image data A is output to the display panel 2.

In the 17th unit period, a determination is made as to whether or not the image data A received in the 16th unit period is the same as image data A received in the 17th unit period. In this case, since these pieces of image data A are the same, the image data A is invalidated in the 18th unit period. Thus, in the 18th unit period, the display controller 4 enters the dormant state.

Figure 4:
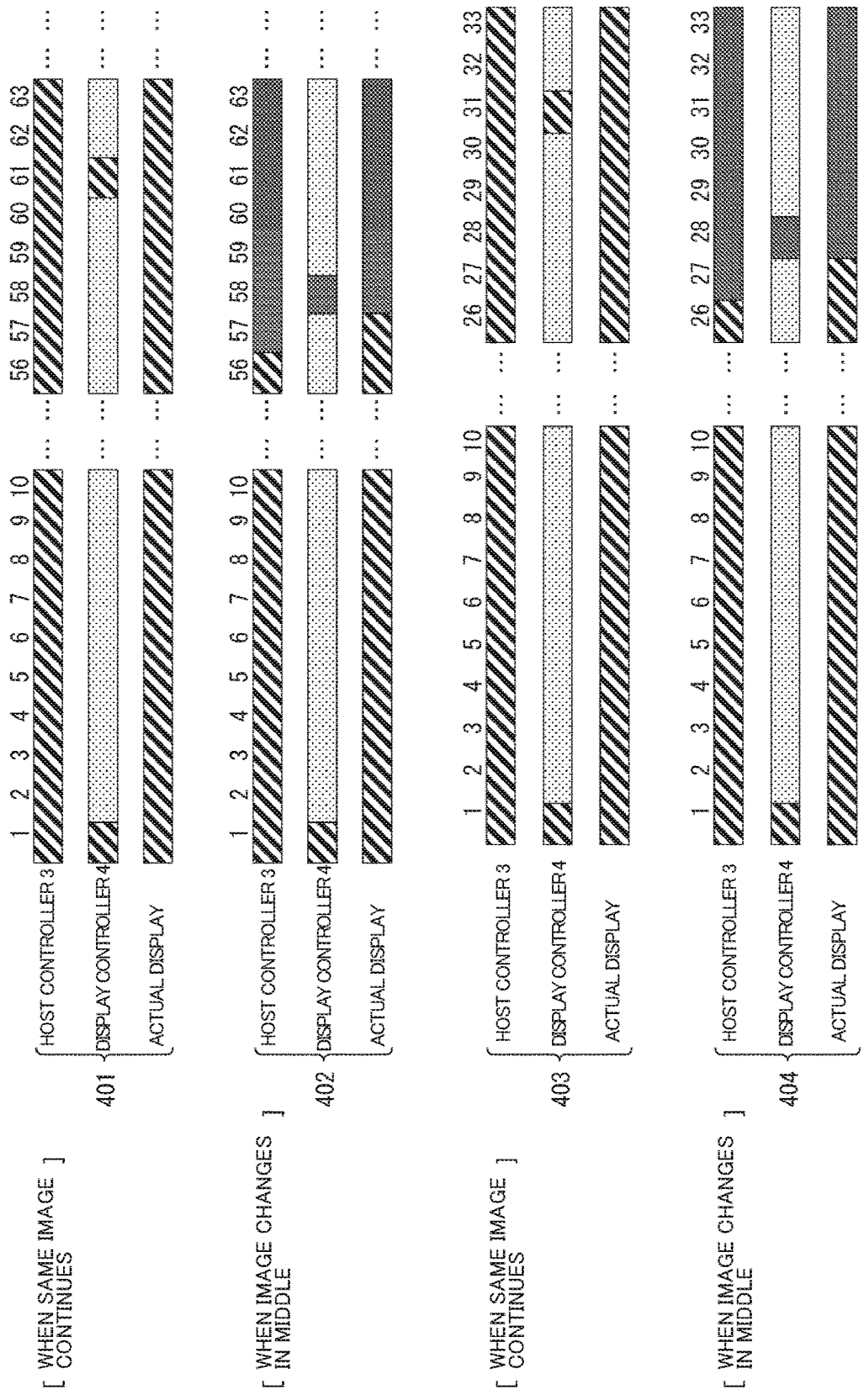
FIG. 4 has timing charts illustrating other examples of the operation of the display device.

Next, a timing chart denoted by number 401 in FIG. 4 illustrates an operation example of the host controller 3, the display controller 4, and the display panel 2 when the frequency at the host side is fixed to 60 Hz. In this example, since the frequency of the host controller 3 is set to 60 Hz, the predetermined count threshold is also 60 correspondingly. Thus, since the predetermined count threshold is reached in the 60th unit period, image data A transferred in the 60th unit period is output to the display panel 2 in the 61st unit period.

Next, a timing chart denoted by number 402 in FIG. 4 illustrates an operation example when the frequency at the host side is fixed to 60 Hz. In the 57th unit period, received image data B is different from image data A transferred in the first to 56th unit periods. Thus, in the 58th unit period, the image data B is output to the display panel 2.

Next, a timing chart denoted by number 403 in FIG. 4 illustrates an operation example when the frequency at the host side is fixed to 30 Hz. In this example, since the frequency of the host controller 3 is set to 30 Hz, the predetermined count threshold is also 30 correspondingly. Thus, since the predetermined count threshold is reached in the 30th unit period, image data A transferred in the 30th unit period is output to the display panel 2 in the 31st unit period.

Next, a timing chart denoted by number 404 in FIG. 4 illustrates an operation example when the frequency at the host side is fixed to 30 Hz. In the 27th unit period, received image data B is different from image data A transferred in the first to 26th unit periods. Thus, in the 28th unit period, the image data B is output to the display panel 2.

Second Embodiment

Another embodiment of the present disclosure will be described below. Members having the same functions as those of the members described in the first embodiment are denoted by the same reference numbers, for convenience of description, and descriptions thereof are not given hereinafter. Since the configuration of a display device in the present embodiment is substantially the same as the configuration of the display device 10 in the first embodiment, descriptions of control blocks are not given hereinafter.

The operation of a display device 10 in the present embodiment differs from the operation of the display device 10 in the first embodiment in the following points. That is, when the frequency adjuster 31 in the host controller 3 adjusts the predetermined frequency, the display controller 4 notifies the image counter 41 in the display controller 4 about a result of the adjustment. Also, the image counter 41 varies the predetermined count threshold in accordance with the adjusted predetermined frequency. This allows the display controller 4 to perform an output operation that is closer to an intended output operation of image data, compared with, for example, a case in which the predetermined count threshold is a fixed value.

(Example of Operation of Display Device 10)

Figure 5:
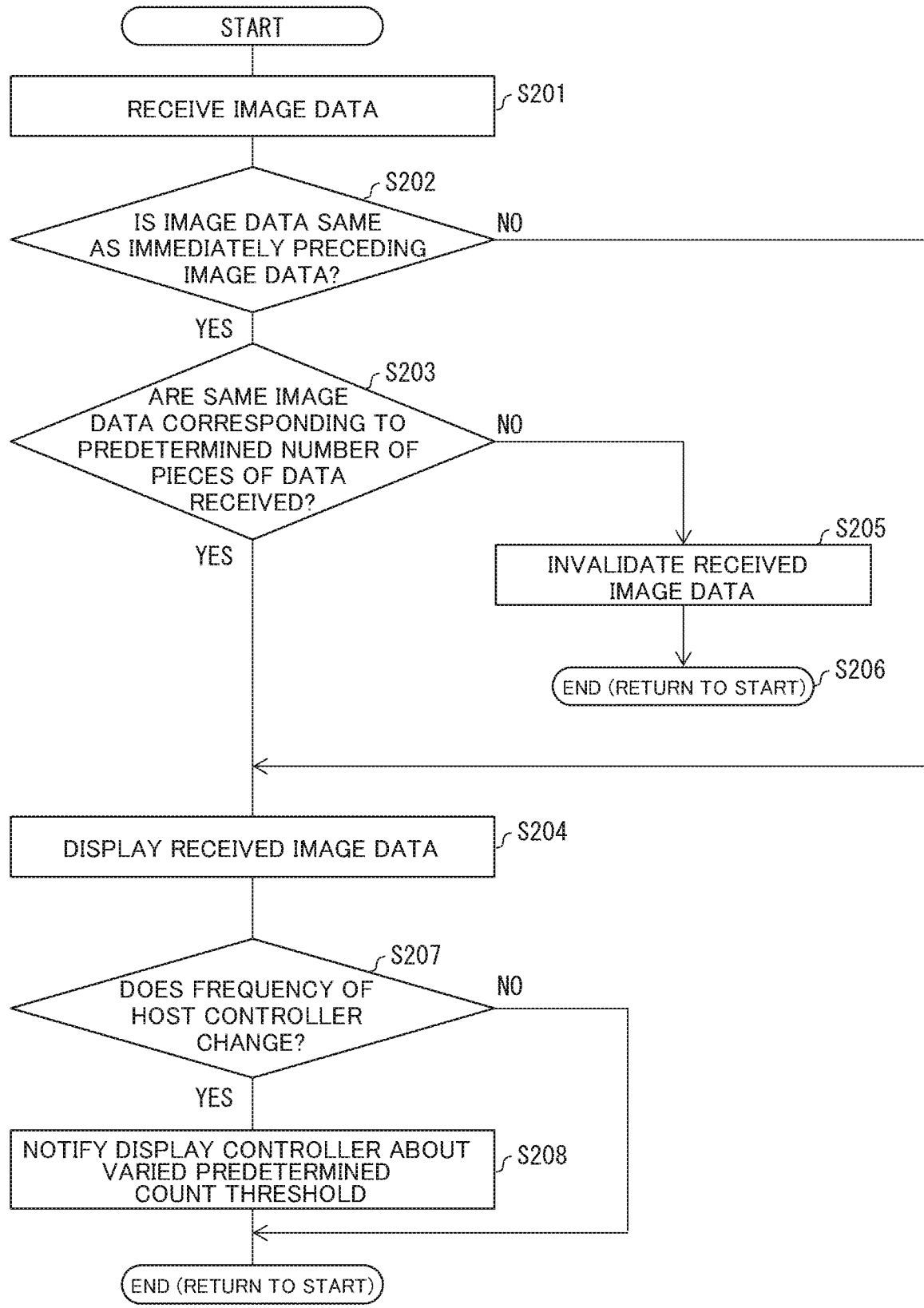
FIG. 5 is a flowchart illustrating one example of the operation of a display device according to a second embodiment of the present disclosure.

Next, one example of operations of the display device 10 will be described with reference to FIG. 5. Since operations from steps S201 to S206 illustrated in FIG. 5 are substantially the same as the operations in steps S101 to S106 illustrated in FIG. 2, descriptions thereof are not given hereinafter.

In step S207, the host controller 3 checks whether or not the predetermined frequency changes. If the predetermined frequency changes (YES), the process proceeds to step S208. On the other hand, if the predetermined frequency does not change (NO), the process ends (returns to Start). In step S208, in accordance with the changed frequency, the host controller 3 varies the predetermined count threshold, notifies the image processor 43 in the display controller 4 about the varied predetermined count threshold. Thereafter, the process ends (returns to Start).

Figure 6:
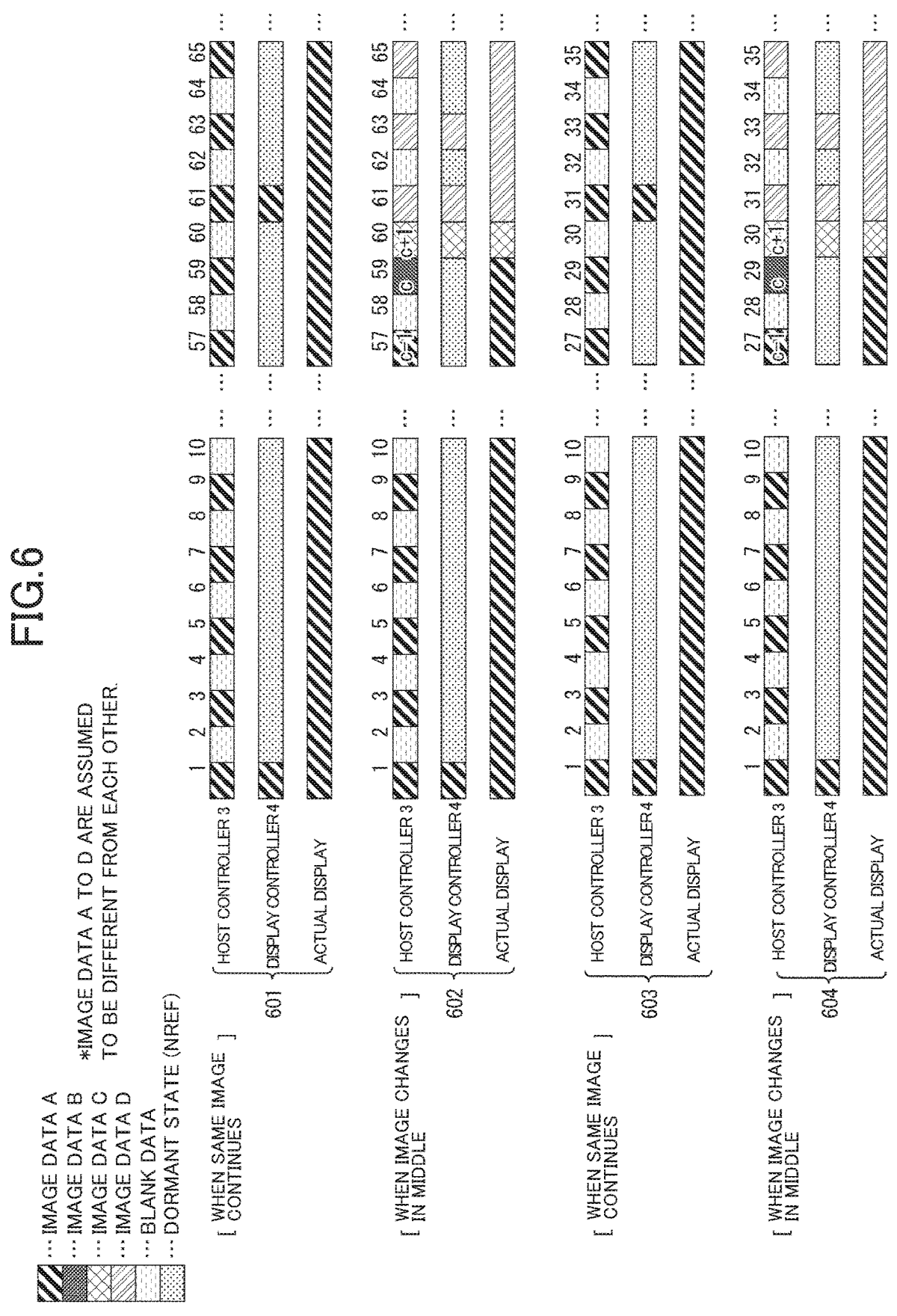

Next, a timing chart denoted by number 601 in FIG. 6 illustrates an operation example of the host controller 3, the display controller 4, and the display panel 2 when the frequency at the host side is fixed to 60 Hz. In this example, since the frequency of the host controller 3 is set to 30 Hz, the predetermined count threshold is also 30 correspondingly. Thus, since the predetermined count threshold is reached in the 59th unit period, image data A transferred in the 59th unit period is output to the display panel 2 in the 61st unit period.

Next, a timing chart denoted by number 602 in FIG. 6 illustrates an operation example when the frequency at the host side is fixed to 30 Hz. In the 59th unit period, received image data B is different from image data A transferred in the first to 57th unit periods. In the 60th unit period, image data C that is different from the image data A and B is transferred from the host controller 3. Thus, the image data C is output to the display panel 2 in the 60th unit period.

Next, a timing chart denoted by number 603 in FIG. 6 illustrates an operation example when the frequency at the host side is fixed to 15 Hz. In this example, since the frequency of the host controller 3 is set to 15 Hz, the predetermined count threshold is also 15 correspondingly.

Thus, since the predetermined count threshold is reached in the 29th unit period, image data A transferred in the 29th unit period is output to the display panel 2 in the 31st unit period.

Next, a timing chart denoted by number 604 in FIG. 6 illustrates an operation example when the frequency at the host side is fixed to 15 Hz. In the 29th unit period, received image data B is different from image data A transferred in the first to 27th unit periods. In the 30th unit period, image data C that is different from the image data A and B is transferred from the host controller 3. Thus, in the 30th unit period, the image data C is output to the display panel 2.

Third Embodiment

Figure 7:
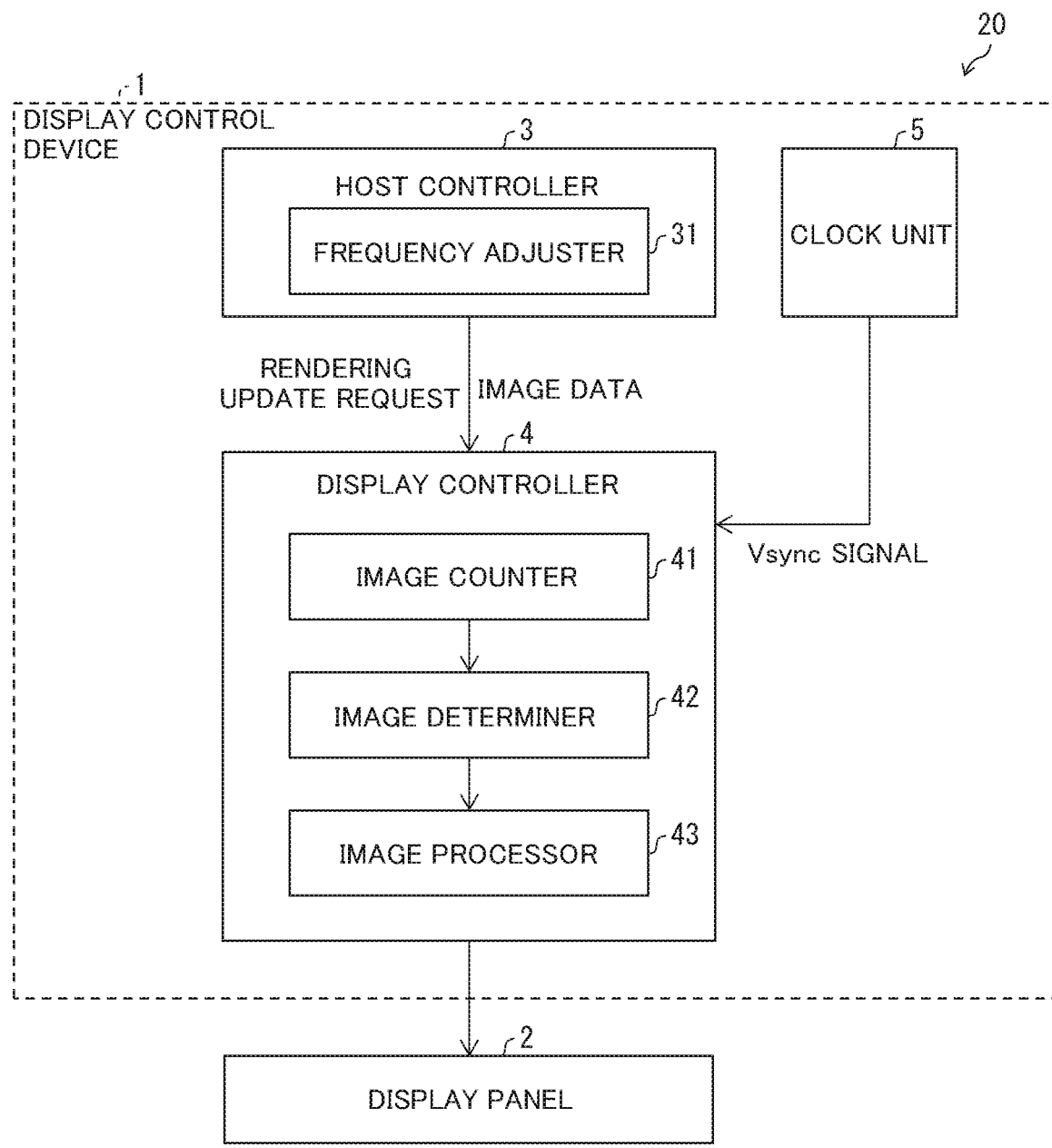
FIG. 7 is a block diagram illustrating the configuration of a display device according to a third embodiment of the present disclosure.

Another embodiment of the present disclosure will be described below. Members having the same functions as those of the members described in the above embodiments are denoted by the same reference numbers, for convenience of description, and descriptions thereof are not given hereinafter. FIG. 7 is a block diagram illustrating the configuration of a display device 20 according to a third embodiment. The display device 20 according to the present embodiment differs from the display devices 10 in the first and second embodiments in that the display control device 1 includes a clock unit 5, and a Vsync signal (a vertical synchronization signal) is independently transmitted from the clock unit 5, instead of the host controller 3, to the display controller 4.

In the DFPS operation of the host controller 3 described in the first embodiment, the intervals of the Vsync signal also increase as the frequency decreases. Since this causes response deterioration, the display device 20 in the present embodiment uses the clock unit 5 to make the cycle of the Vsync signal independent from the DFPS state of the host controller 3. Also, when the display control device 1 is configured to be able to get out of a DFPS low-frequency drive state immediately upon the rendering update, it is possible to improve the response. In addition, the display control device 1 may also be configured so as to get out of the DFPS low-frequency drive state in synchronization with a signal of a function of another device, such as a touch panel.

(Implementation Example Using Software)

Control blocks (particularly, the host controller 3 and the display controller 4) in the display control device 1 may be implemented by a logic circuit (hardware) formed in an integrated circuit (IC) chip or the like or may be implemented by software.

In the latter case, the display control device 1 includes a computer that executes instructions from a program that is software for realizing individual functions. The computer includes, for example, at least one processor (control device) and at least one computer-readable recording medium storing the program therein. In the computer, the processor reads the program from the recording medium and executes the program to thereby implement the functions of the above-described display control device. The processor can be implemented by, for example, a CPU. The recording medium can be implemented by a non-transient tangible medium, such as a read-only memory (ROM), a tape, a disc/disk, a card, a semiconductor memory, a programmable logic circuit, or the like. The computer may further include a random-access memory (RAM) or the like to which the program is loaded. The program may also be transmitted to the computer over an arbitrary transmission medium (such as a communications network or a broadcast radio wave). One aspect of the present disclosure can also be realized in the form of data signals obtained by electronically transmitting the program over a carrier wave.

[Brief Summary]

A display control device (1) according to a first aspect of the present disclosure is a display control device that controls a display device (10, 20) including a display panel (2) on which an image is rendered to display the image. The display control device includes: a host controller (3) that obtains or generates image data of the image; and a display controller (4) that outputs the image data to the display panel, the image data being transferred from the host controller to the display controller. The host controller outputs a vertical synchronization signal to the display controller, issues a request for rendering update of the image to the display controller, and transfers the image data to the display controller at a predetermined frequency; and when the display controller outputs first image data to the display panel, and then second image data is transferred from the host controller to the display controller, the display controller determines whether the first image data and the second image data are same or different from each other to determine whether or not the second image data is to be output to the display panel.

According to this configuration, when the first image data and the second image data are the same, for example, the display controller is allowed not to output the second image data to the display panel. Thus, the frequency of the image-data output of the display controller can be reduced by not performing rendering update on an image that is the same as a certain image displayed on the display panel. As a result, it is possible to reduce the power consumed by the display controller.

Also, for example, when the first image data and the second image data are different from each other, the display controller can output the second image data to the display panel. That is, when image data of an image that is different from a certain image displayed on the display panel is transferred to the display controller, it is possible to immediately perform rendering update of the image displayed on the display panel. Thus, for example, compared with a case in which the rendering update is performed based on rendering-time measurement using a timer, the response of the rendering update is sped up, and it is also possible to perform rendering update that flexibly deals with changes in the image data.

In addition, in the display control device, since the frequency of the image-data output can be reduced with only the processing at the display controller, the image data can be transferred from the host controller with the predetermined frequency being increased to, for example, 30 to 60 Hz, while reducing the power consumed by the display controller. Thus, it is possible to prevent or reduce an increase in the intervals of outputting the vertical synchronization signal, so that the response of the rendering update can be maintained in a favorable state.

A display control device (1) according to a second aspect of the present disclosure may have a configuration in which, in the first aspect, when the first image data and the second image data are the same, the display controller (4) invalidates the second image data, and when the first image data and the second image data are different from each other, the display controller outputs the second image data to the display panel.

According to this configuration, when the first image data and the second image data are the same, the display controller invalidates the second image data. Thus, the frequency of image-data output of the display controller can be reduced, and the power consumed by the display controller can be reduced.

Also, when the first image data and the second image data are different from each other, the display controller outputs the second image data to the display panel. Thus, for example, compared with a case in which the rendering update is performed based on rendering-time measurement using a timer, the response of the rendering update is sped up, and it is also possible to perform rendering update that flexibly deals with changes in the image data.

A display control device (1) according to a third aspect of the present disclosure may have a configuration in which, in the second aspect, the display controller (4) counts the number of pieces of the second image data transferred from the host controller (3) after outputting the first image data to the display panel (2), invalidates the second image data, when the first image data and the second image data are the same, and the counted number of pieces of the second image data is smaller than a predetermined count threshold, and outputs the second image data to the display panel, when the first image data and the second image data are different from each other, or when the counted number of pieces of the second image data reaches the predetermined count threshold.

A period during which the display panel can continue to display a certain image when the display controller does not output new image data (this period is referred to as an "image retention period") is largely dependent on a charge retention characteristic of the display panel. In this respect, according to this configuration, the image retention period of an image corresponding to the first image data after the first image data is output to the display panel is, at the longest, a period until the number of pieces of the second image data transferred to the display controller reaches the predetermined count threshold. Thus, when the predetermined count threshold is set according to the charge retention characteristic of the display panel so that the period until the number of pieces of the second image data transferred to the display controller reaches the predetermined count threshold is within the image retention period of the display panel, images can be seamlessly displayed on the display panel.

A display control device (1) according to a fourth aspect of the present disclosure may have a configuration in which, in the third aspect, the host controller (3) is capable of adjusting the predetermined frequency, and when the host controller adjusts the predetermined frequency, the display controller (4) varies the predetermined count threshold in accordance with the adjusted predetermined frequency.

According to this configuration, the display controller varies the predetermined count threshold in accordance with the adjusted predetermined frequency. Thus, the display controller can perform an output operation that is closer to an intended output operation of image data, compared with, for example, a case in which the predetermined count threshold is a fixed value.

A display control device (1) according to a fifth aspect of the present disclosure may have a configuration in which, in one of the first to third aspects, the host controller (3) is capable of adjusting the predetermined frequency.

According to this configuration, since the predetermined frequency can be adjusted, for example, both the predetermined frequency and the frequency of image-data output of the display controller can be reduced to reduce the overall power consumed by the display control device.

In accordance with the adjusted predetermined frequency, the display controller can switch the operation mode of the display panel. Specifically, for example, when the predetermined frequency is reduced by the adjustment, the display controller can switch the operation mode of the display panel to a still-image display mode in which a still image, which is an image that does not change from one frame to another, is displayed. Also, for example, when the predetermined frequency is increased by the adjustment, the display controller can switch the operation mode of the display panel to a moving-image display mode in which a moving image, which is an image that changes from one frame to another, is displayed.

A display device (10, 20) according to a sixth aspect of the present disclosure may include the display control device (1) according to one of the first to fifth aspects described above. According to this configuration, it is possible to provide advantages that are analogous to those of the first aspect described above.

A control method for a display control device according to a seventh aspect of the present disclosure is a control method for a display control device (1) that controls a display device (10, 20) including a display panel (2) on which an image is rendered to display the image. The display control device includes: a host controller (3) that obtains or generates image data, and a display controller (4) that outputs the image data to the display panel in the display device, the image data being transferred from the host controller to the display controller. The control method includes: causing the host controller to output a vertical synchronization signal to the display controller, to issue a request for rendering update of the image to the display controller, and to transfer the image data to the display controller at a predetermined frequency; and causing, when the display controller outputs first image data to the display panel, and then second image data is transferred from the host controller to the display controller, the display controller to determine whether the first image data and the second image data are same or different from each other to determine whether or not the second image data is to be output to the display panel. According to this method, it is possible to provide advantages that are analogous to those of the first aspect described above.

The display control device according to each aspect of the present disclosure may be realized by a computer, and in this case, a control program for the display control device which causes the computer to realize the display control device by causing the computer to operate as individual units (software elements) included in the display control device and a computer-readable recording medium recording the control program therein also fall within the category of the present disclosure.

[Appendix]

The present disclosure is not limited to each embodiment described above, various changes are possible within the scope recited in the appended claims, and embodiments obtained by appropriately combining the technical means respectively disclosed in the different embodiments are also encompassed by the technical scope of the present disclosure. In addition, new technical features can be formed by combining the technical means respectively disclosed in the embodiments.

The present disclosure contains subject matter related to that disclosed in Japanese Priority Patent Application JP 2019-181355 filed in the Japan Patent Office on Oct. 1, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device that controls a display device including a display panel on which an image is displayed, the display control device comprising:
   a host controller that obtains or generates image data of the image; and
   a display controller that outputs the image data to the display panel, the image data being transferred from the host controller to the display controller, wherein:
   the host controller outputs a vertical synchronization signal to the display controller, issues a request for rendering update of the image to the display controller, and transfers the image data to the display controller at a predetermined frequency; and
   when the display controller outputs first image data to the display panel, and then second image data is transferred from the host controller to the display controller, the display controller:
   determines whether the first image data and the second image data are same or different from each other to determine whether or not the second image data is to be output to the display panel,
   when the first image data and the second image data are the same, invalidates the second image data, and when the first image data and the second image data are different from each other, outputs the second image data to the display panel,
   counts a number of frames of the second image data transferred from the host controller after outputting the first image data to the display panel, and
   outputs the second image data to the display panel when the counted number of frames of the second image data reaches a predetermined count threshold.

2. The display control device according to claim 1, wherein the display controller further invalidates the second image data, when the counted number of frames of the second image data is smaller than the predetermined count threshold.

3. The display control device according to claim 2, wherein:
   the host controller further adjusts the predetermined frequency; and
   when the host controller adjusts the predetermined frequency, the display controller varies the predetermined count threshold in accordance with the adjusted predetermined frequency.

4. The display control device according to claim 1, wherein the host controller further adjusts the predetermined frequency.

5. A display device comprising:
   the display control device according to claim 1.

6. The display control device according to claim 1, wherein the display controller sets the predetermined count threshold according to a charge retention characteristic of the display panel such that the counted number of frames of the second image data reaches the predetermined count threshold within a period during which the display panel retains the image.

7. The display control device according to claim 1, wherein:
   the host controller transfers the second image data at 30 to 60 Hz, and
   the display controller outputs the image data at a frequency lower than 30 to 60 Hz.

8. A control method for a display control device that controls a display device including a display panel on which an image is displayed, wherein the display control device comprises a host controller that obtains or generates image data of the image, and a display controller that outputs the image data to the display panel, the image data being transferred from the host controller to the display controller, the control method comprising:
   causing the host controller to output a vertical synchronization signal to the display controller, to issue a request for rendering update of the image to the display controller, and to transfer the image data to the display controller at a predetermined frequency; and
   causing, when the display controller outputs first image data to the display panel, and then second image data is transferred from the host controller to the display controller, the display controller to:
   determine whether the first image data and the second image data are same or different from each other to determine whether or not the second image data is to be output to the display panel,
   when the first image data and the second image data are the same, invalidate the second image data, and when the first image data and the second image data are different from each other, output the second image data to the display panel,
   count a number of frames of the second image data transferred from the host controller after outputting the first image data to the display panel, and
   output the second image data to the display panel when the counted number of frames of the second image data reaches a predetermined count threshold.

9. The control method according to claim 8, further comprising causing the display controller to set the predetermined count threshold according to a charge retention characteristic of the display panel such that the counted number of frames of the second image data reaches the predetermined count threshold within a period during which the display panel retains the image.

10. The control method according to claim 8, further comprising:
    causing the host controller to transfer the second image data at 30 to 60 Hz, and
    causing the display controller to output the image data at a frequency lower than 30 to 60 Hz.

* * * * *